United States Patent [19]
Linn

[11] Patent Number: 6,105,447
[45] Date of Patent: Aug. 22, 2000

[54] ECCENTRIC CRANK WITH CONTINUOUSLY ADJUSTABLE THROW

[76] Inventor: Orville J. Linn, Rural Route 4, Box 130, Saskatoon, Saskatchewan, Canada, S7K 3J7

[21] Appl. No.: 09/098,827

[22] Filed: Jun. 17, 1998

[30] Foreign Application Priority Data

Jun. 17, 1997 [CA] Canada ................................ 2207863

[51] Int. Cl.$^7$ .................................................. F16H 21/16
[52] U.S. Cl. ............................. 74/25; 74/117; 74/571 R; 74/835
[58] Field of Search .................... 74/25, 117, 571 R, 74/835, 836, 840, 116

[56] References Cited

U.S. PATENT DOCUMENTS

| 4,249,424 | 2/1981 | Glazier | 74/25 |
| 4,682,532 | 7/1987 | Erlandson | 92/13.7 |
| 4,858,815 | 8/1989 | Roberts et al. | 228/2 |
| 5,261,294 | 11/1993 | Ticer et al. | 74/594.1 |

*Primary Examiner*—David M. Fenstermacher
*Attorney, Agent, or Firm*—Middleton & Reutlinger; John F. Salazar

[57] ABSTRACT

The invention provides an eccentric wherein the amplitude of reciprocation, or throw, is continuously variable, during operation, from zero to a maximum. This represents an improvement over adjustable eccentric devices in the prior art insofar as the conventional devices needed to be shut down and physically reconfigured to adjust the throw of the reciprocating arm. The invention will be of use in many functions, including precision farming applications.

6 Claims, 4 Drawing Sheets

ECCENTRIC CRANK WITH CONTINUOUSLY ADJUSTABLE THROW

BACKGROUND OF THE INVENTION

Eccentrics are used to convert rotary motion into reciprocating linear motion, or vice versa. The amplitude of reciprocation, or throw, may be fixed or variable. In variable throw eccentrics, the adjustment is commonly accomplished by stopping the operation of the device and adjusting the relationship of the parts of the device.

In many applications, it would be desirable to be able to adjust the throw while the eccentric is in motion. In the particular application of metering seed or fertilizer in agricultural seeding implements such as air-seeders, with a suitable metering device a continuously variable throw eccentric drive would allow the rate of application to be varied during operation. In the emerging field of precision farming such desired rates change while passing over various parts of a field. Global positioning systems are used to transmit the precise field location to a computer which can then send the appropriate signal to the metering drive to adjust the rate of application. The metering drives presently used to respond to these signals are expensive and cumbersome.

Similar uses can be seen for metering in other applications such as feed mills, pharmaceutical manufacturing, mines, etc. As well, such a variable throw eccentric could be well utilized in driving shakers, vibrators and the like.

Starting torque requirements could be reduced by an eccentric device which was adjustable in operation. A short throw provides more torque which could be an advantage in start-up, with the throw being gradually increased. The eccentric drive motor could be started with the eccentric in neutral, or zero throw. As the throw is increased, the shaker would gradually attain the desired action. Such a device would act essentially like a clutch. Starting torque requirements often dictate the use of a motor with more power than that required for continuous operation. An example of a conventional variable throw eccentric is described in U.S. Pat. No. 4,249,424.

Conventional eccentric devices are costly and prone to mechanical difficulty.

SUMMARY OF THE INVENTION

It is an object of the present invention to provide an eccentric where the amplitude of reciprocation, or throw, is continuously variable, during operation, from zero to a maximum.

The invention accomplishes these objects comprising substantially a sleeve, said sleeve having a first end and a second end, rotatably mounted on a frame; a control shaft, said control shaft having an inner end and a projecting end, fitted inside said sleeve such that the projecting end of the control shaft projects from the second end of the sleeve and such that said control shaft may move freely within the sleeve along the axis of said sleeve from a withdrawn position, where the said projection is minimized, to a projected position where the said projection is maximized; hinge point support means fixedly attached to the sleeve and supporting a first hinge point at some distance from the axis of the sleeve; a throw arm, with a hinge end and a pivot end, the hinge end being hingably attached at the first hinge point such that the said arm may move freely in a plane generally defined by the first hinge point and the axis of the sleeve; a pivot attachment point at the pivot end of the throw arm; a linkage member, having a shaft end and an arm end, the shaft end being hingably attached to a shaft hinge point on the control shaft near the projecting end of the control shaft and the arm end being hingably attached to an arm hinge point at a mid-point of the throw arm, which hingable attachments are such that the pivot attachment point at the pivot end of the throw arm is in alignment with the axis of the sleeve when the control shaft is in the withdrawn position and moves away from said axis when the control shaft is moved towards the projected position; means to move the control shaft from the withdrawn position to the projected position; and a crank arm, pivotally mounted to the pivot point at the pivot end of the throw arm.

The provision of an eccentric wherein the amplitude of reciprocation is continuously adjustable during operation from zero to a maximum, may also be accomplished where the invention comprises a fixed throw eccentric reciprocally driving a member which is mounted at a pivot point at one end; a by crank arm, having a driving end pivotally connected to the driven device at one end, and a driven end engaged in a channel on the reciprocating member; an actuator attached to the crank arm moves the driven end of the crank arm along the channel, from the pivot point, where the amplitude of reciprocation is zero, to points on the channel removed from said pivot point, thereby achieving various amplitudes of reciprocation.

As the crank pivot point moves away from the axis of rotation, the amplitude of reciprocation will increase from zero to a maximum. This movement is simply and economically accomplished by the invention. The present invention also has the advantage of providing a free eccentric point for driving shaker cranks and so forth.

It is contemplated that the invention will be useful both for converting rotary motion to reciprocating linear motion, and vice versa.

It is also contemplated that in some applications it may not be desired to adjust the amplitude of reciprocation to zero, in which case the eccentric point could be moved from a point removed from the axis of rotation or pivot point, to a different position removed from the axis or pivot point.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE PREFERRED EMBODIMENTS

Figure 1:
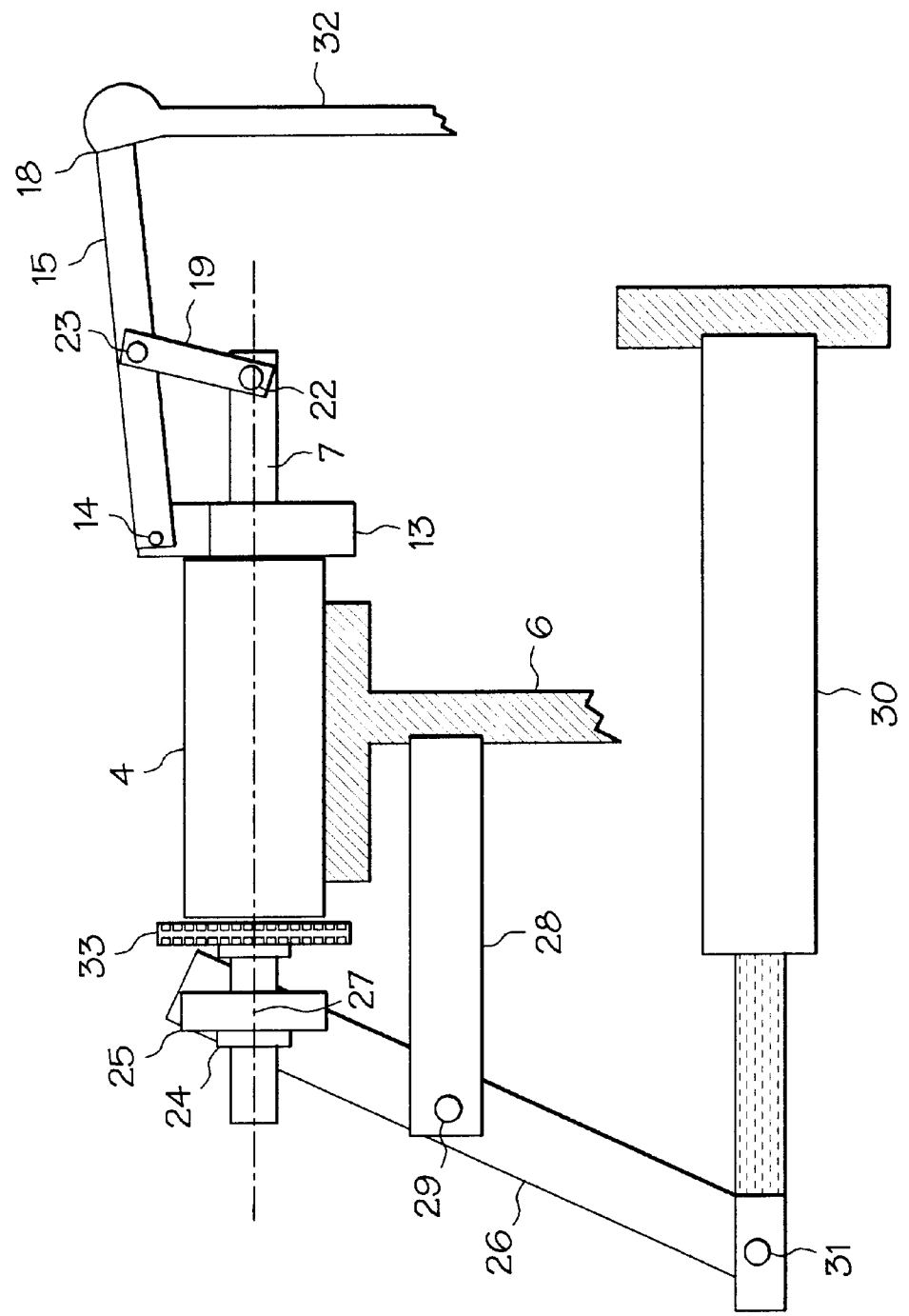
FIG. 1 is a plane view of the preferred embodiment.
Figure 3A:
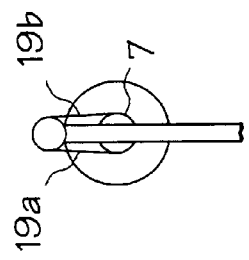
FIG. 3 is a plane view of the preferred embodiment showing the control shaft in the projected position and FIG. 3A is an end view showing the degree of eccentricity being a maximum.
Figure 4A:
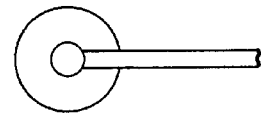
FIG. 4 is a plane view of the preferred embodiment showing the control shaft in the withdrawn position and FIG. 4A is an end view showing the degree of eccentricity being zero.
Figure 3:
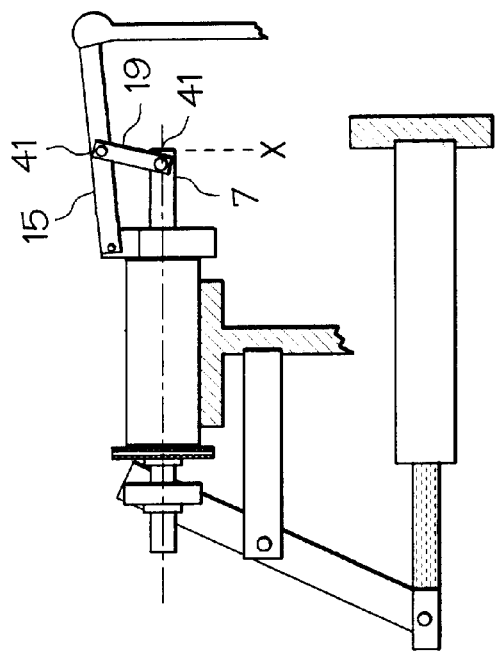

FIG. 1 shows an embodiment of the invention. The invention is an eccentric wherein the amplitude of reciprocation is continuously adjustable during operation from zero to a maximum, comprising a sleeve 3 having a first end 1 and a second end 2 and an axis 10, said sleeve rotatably mounted on a frame 6; a control shaft 7 having an inner end 8 and a projecting end 9, said control shaft 7 fitted inside the sleeve 3 such that the projecting end 9 of the control shaft projects from the second end 2 of the sleeve and such that the control shaft 7 may move freely within the sleeve 3 along the axis 10 of the sleeve from a withdrawn position Y, where the said projection is minimized, to a projected position X where the said projection is maximized; hinge point support means fixedly attached to the sleeve 3 and supporting a first hinge point 14 at some distance from the axis 10 of the sleeve; a throw arm 15 with a hinge end 16 and a pivot end 17, the hinge end 16 being hingably attached at the first hinge point 14 such that the throw arm 15 may move freely in a plane defined by the first hinge point 14 and the axis 10 of the sleeve; a pivot attachment point at the pivot end 17 of the throw arm; a linkage member 19 having a shaft end 20 and an arm end 21, the shaft end 20 being hingably attached to a shaft hinge point 22 on the control shaft near the projecting end 9 of the control shaft, and the arm end 21 being hingably attached to an arm hinge point 23 at a mid-point of the throw arm 15, which hingable attachments are such that the pivot attachment point 18 at the pivot end 17 of the throw arm is in alignment with the axis of the sleeve 3 when the control shaft 7 is in the withdrawn position Y and moves away from the axis of the sleeve 3 when the control shaft 7 is moved towards the projected position X; control shaft movement means to move the control shaft 7 from the withdrawn position Y to the projected position X; and a crank arm 32, pivotally mounted to the pivot point 18 at the pivot end 17 of the throw arm. As illustrated in FIGS. 3 and 3A the linkage member 19 comprises two linkage plates 19a, 19b. Shaft hinge point 22 is provided by a shaft pin 40 through corresponding holes in the linkage plates 19a, 19b and shaft 7. Arm hinge point 23 is provided by an arm pin 41 through corresponding holes in the linkage plates 19a, 19b and throw arm 15.

Figure 2:
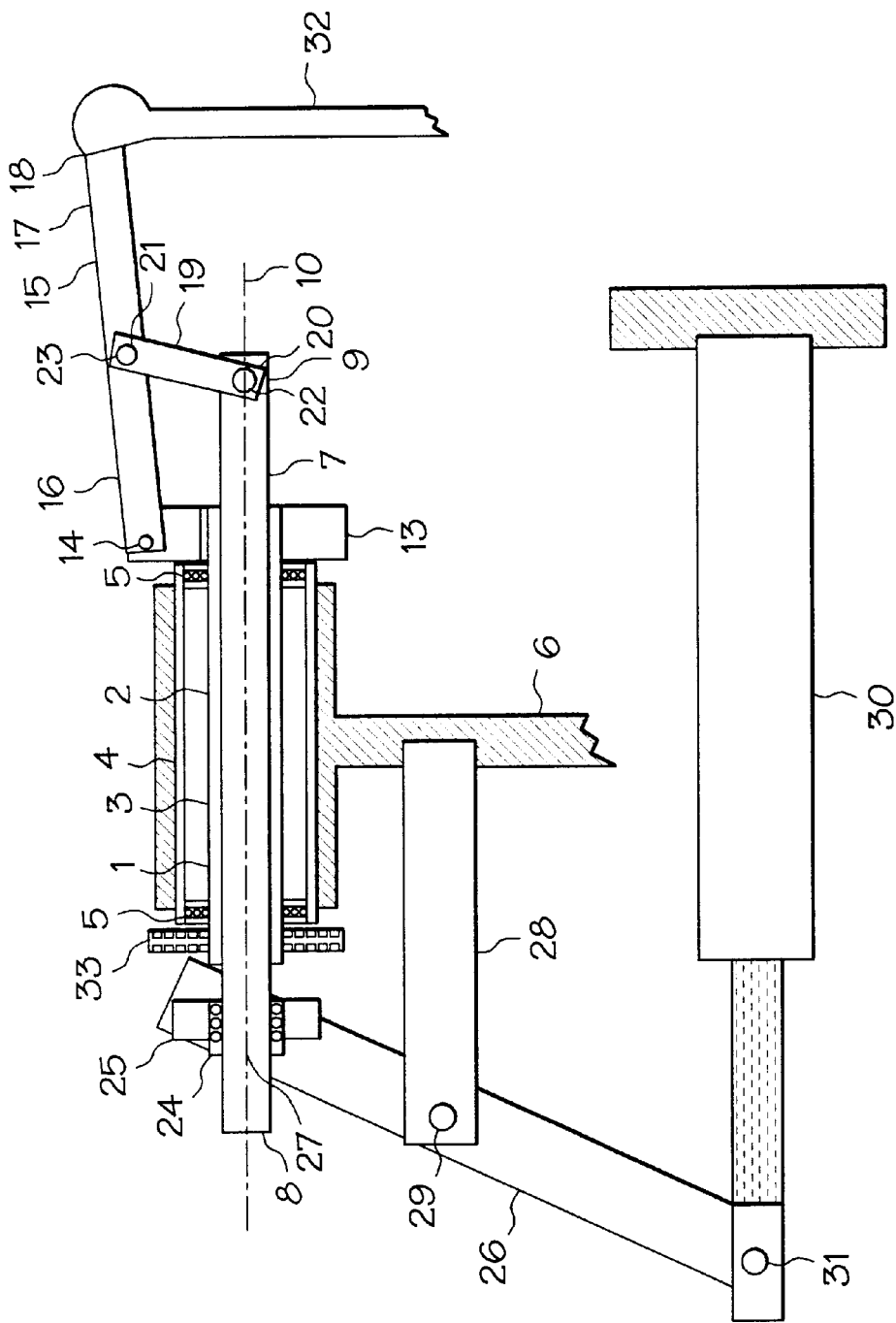
FIG. 2 is a cross sectional view of the preferred embodiment.

In the embodiment shown in FIGS. 1 and 2, the sleeve 3 is substantially cylindrical and is rotatably mounted inside a cylindrical housing 4 via sleeve bearings 5, said cylindrical housing 4 being fixed to the frame 6. The drive sprocket 33 is fixedly attached to the sleeve 3.

The hinge point support means in this embodiment consists of a hinge point support collar 13 fixedly attached to the sleeve 3 and supporting a first hinge point 14 at some distance from the axis 10 of the sleeve 3. The pivot attachment point at the pivot end 17 of the throw arm is a ball and socket attachment point 18.

The hingable attachments of the linkage member 19 to the control shaft 7 and the throw arm 15 are such that the ball and socket attachment point 18 at the pivot end 17 of the throw arm 15 is in line with the axis 10 of the sleeve when the control shaft 7 is in the withdrawn position Y and moves away from said axis 10 when the control shaft 7 is moved towards the projected position X.

The embodiment further includes a shaft bearing 24 fixed to the inner end 8 of the control shaft and mounted is in pillow block 25 such that the control shaft 7 rotates freely; a control arm 26 attached to pillow block 25 at pillow block attachment point 27 and to fulcrum 28 at control arm pivot point 29; actuator 30 attached to control arm 26 at actuator attachment point 31.

Is in operation, the sleeve 3 is rotated by external means acting on sprocket 33. This rotation is transmitted through linkage member 19 to the control shaft 7, causing said control shaft 7 to rotate with the sleeve 3, on shaft bearing 24. When the control shaft 7 is in the withdrawn position Y, ball and socket attachment point 18 is in line with the axis 10 of the sleeve 3 and crank arm 32 is at rest. As actuator 30 acts on control arm 26 moving control shaft 7 towards the projected position X, ball and socket attachment point 18 is moved away from the axis 10 of the sleeve 3, and crank arm 32 reciprocates, reaching a maximum amplitude of reciprocation when the control shaft 7 reaches the projected position X. Actuator 30 may be stopped at any point is in the range when the desired amplitude of reciprocation has been attained, and then activated is in either direction to increase or decrease said amplitude.

FIG. 3 shows this preferred embodiment with the control shaft 7 is in the projected position X.

Figure 4:
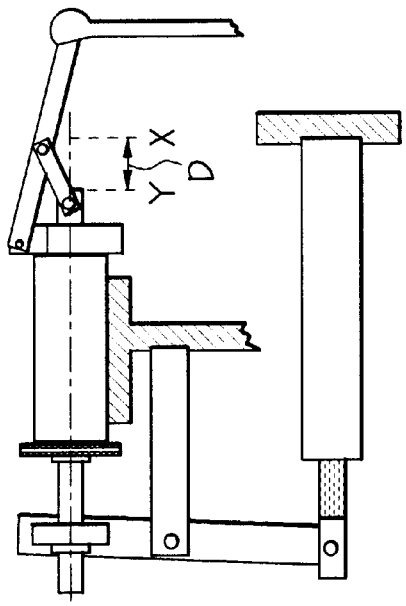

FIG. 4 shows this preferred embodiment with the control shaft 7 is in the withdrawn position Y, a distance D from the projected position X.

Figure 5:
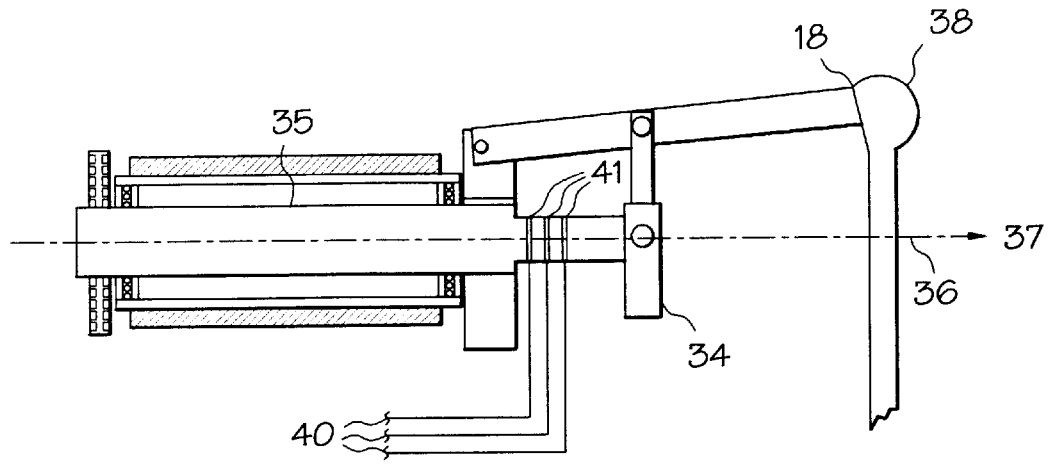
FIG. 5 is a plane view of an embodiment utilizing a shaft mounted linear electric actuator to adjust the throw arm and thereby the amplitude of reciprocation.

FIG. 5 shows the embodiment wherein a linear actuator 34 acts on the throw arm 15 to move the ball and socket attachment point 18 from a point 35 coincidental with the axis 37 of the shaft 35 to a point 38 removed from the axis 37, thereby providing reciprocation.

Figure 7:
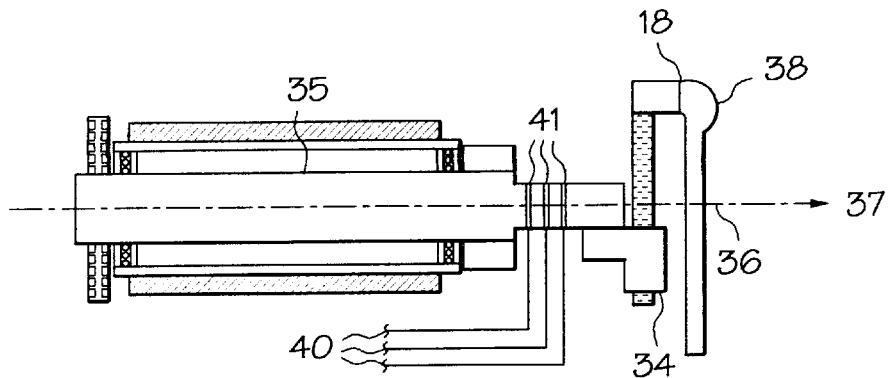

FIG. 7 shows another embodiment of the invention wherein a linear actuator 34 is fixed to a rotatably mounted shaft 35. Ball and socket attachment point 18 is attached to said actuator 34 such that said ball and socket attachment point 18 may be moved from a point 36 coincidental with the axis 37 of the shaft 35 to a point 38 removed from the axis 37, thereby providing reciprocation.

Figure 6:
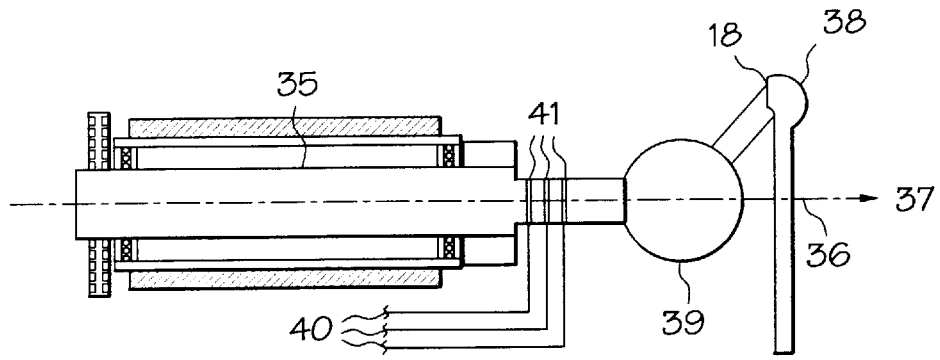
FIG. 6 is a plane view of an embodiment utilizing a shaft mounted rotary electric actuator to directly adjust the amplitude of reciprocation; and, FIG. 7 is a plane view of an embodiment utilizing a shaft mounted linear electric actuator to directly adjust the amplitude of reciprocation.

FIG. 6 shows the embodiment of FIG. 7 wherein a rotary actuator 39 replaces the linear actuator 34.

Is in the embodiments shown is in FIGS. 5, 6 and 7, power and control are passed to the actuators mounted on the rotating shaft 35 by wires 40 through slip rings 41.

The control shaft movement means could be an electrical or hydraulic actuator. It will, however, also be understood that other methods of actuation could also be used and are contemplated within the scope of the invention.

The foregoing is considered as illustrative only of the principals of the invention. Further, since numerous changes and modifications will readily occur to those skilled is in the art, it is not desired to limit the invention to the exact construction and operation shown and described, and accordingly, all such suitable changes or modifications is in structure or operation which may be resorted to are intended to fall within the scope of the claimed invention.

I claim:

1. An eccentric wherein the amplitude of reciprocation is continuously adjustable during operation comprising:
   a sleeve, having a first end, a second end, and an axis of rotation, rotatably mounted on a frame;
   a shaft slidable inside said sleeve, said shaft having a projecting end projecting from said second end of said sleeve, said shaft freely movable along said sleeve from a withdrawn position to a projected position, where said projecting end is nearer said sleeve in said withdrawn position than in said projected position;

hinge point support means fixedly attached to said sleeve and supporting a first hinge point removed from said axis of said sleeve;

a throw arm with a hinge end and a pivot end, said hinge end hingably attached at said first hinge point such that said arm may move freely in a plane defined by said first hinge point and said axis of the sleeve;

a pivot attachment point located at said pivot end of said throw arm;

a linkage member having a shaft end and an arm end, said shaft end hingably attached to a shaft hinge point on said shaft near said projecting end thereof and said arm end hingably attached to an arm hinge point at a mid-point of said throw arm, such that said pivot attachment point is located at a first point on said plane when said shaft is in said withdrawn position and moves away from said axis along said plane when said shaft is moved towards said projected position; and means to move said shaft from said withdrawn position to said projected position while said shaft is rotating.

2. The device of claim 1 wherein said sleeve and said shaft have a circular cross-section.

3. The device of claim 1 wherein said sleeve and said shaft have a cross-section comprising a plurality of straight lines.

4. The device of claim 1 wherein said linkage member comprises two plates, one on each side of said shaft and arm, and said hinge points on said shaft and throw arm comprise holes through which pins connecting the two plates are passed.

5. The device of claim 1 further comprising a crank arm pivotally attached to said pivot attachment point.

6. The device of claim 5 wherein said crank arm is attached to said pivot attachment point by a ball and socket connection.

* * * * *